US006999865B2

(12) United States Patent
Jessen

(10) Patent No.: US 6,999,865 B2
(45) Date of Patent: Feb. 14, 2006

(54) METHOD FOR OPERATING AN INTERNAL COMBUSTION ENGINE; CONTROL AND/OR REGULATING DEVICE FOR AN INTERNAL COMBUSTION ENGINE; COMPUTER PROGRAM; AND ELECTRICAL STORAGE MEDIUM OF AN INTERNAL COMBUSTION ENGINE

(75) Inventor: Holger Jessen, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 10/776,411

(22) Filed: Feb. 10, 2004

(65) Prior Publication Data
US 2004/0220717 A1   Nov. 4, 2004

(30) Foreign Application Priority Data
Feb. 13, 2003   (DE) ................ 103 05 878

(51) Int. Cl.
    B60T 7/12   (2006.01)
(52) U.S. Cl. .............. 701/104; 701/103; 123/339.1; 123/478; 123/480; 73/117.1; 73/117.2; 73/118.2
(58) Field of Classification Search ........... 701/103, 701/104; 123/339.1, 478, 480; 73/117.1, 73/117.2, 118.2
    See application file for complete search history.

(56) References Cited

U.S. PATENT DOCUMENTS
6,785,600 B1 *   8/2004   Birk et al. .............. 701/104

FOREIGN PATENT DOCUMENTS
DE   100 30 936   1/2002

* cited by examiner

Primary Examiner—Tony M. Argenbright
Assistant Examiner—Johnny H. Hoang
(74) Attorney, Agent, or Firm—Kenyon & Kenyon

(57) ABSTRACT

In a method for operating an internal combustion engine, the air-fuel ratio in a combustion chamber is a function of the operating conditions and/or the operating state of the internal combustion engine. It is provided that, with the aid of a data model, a variable expressing a target air-fuel ratio is ascertained from a target torque and an air mass determined with the aid of a model or a measured value, and in addition a setpoint fuel quantity to be injected into the combustion chamber is determined and, using the same data model, a setpoint air mass to be conveyed to the combustion chamber is determined from the target torque and a variable expressing a predefined air-fuel ratio in the combustion chamber.

11 Claims, 4 Drawing Sheets

METHOD FOR OPERATING AN INTERNAL COMBUSTION ENGINE; CONTROL AND/OR REGULATING DEVICE FOR AN INTERNAL COMBUSTION ENGINE; COMPUTER PROGRAM; AND ELECTRICAL STORAGE MEDIUM OF AN INTERNAL COMBUSTION ENGINE

FIELD OF THE INVENTION

The present invention, first of all, relates to a method for operating an internal combustion engine, in particular a combustion engine having direct fuel injection, in which the air-fuel ratio in a combustion chamber is a function of the operating conditions, i.e., the operating state of the internal combustion engine.

The present invention also relates to a corresponding computer program, a corresponding electrical storage medium for a control device, and a control and/or regulating device.

BACKGROUND INFORMATION

A method of the type mentioned above is known from the market. It is used in internal combustion engines having direct fuel injection. In such internal combustion engines a NOx adsorption catalyst is provided to reduce emissions. The internal combustion engine usually operates in an operating mode in which the fuel-air mixture present in the combustion chamber is lean. The nitrogen oxides produced in this operating mode are absorbed by the NOx adsorption catalyst and stored temporarily.

However, for the operation of the internal combustion engine having the NOx adsorption catalyst it is necessary from time to time to switch from this first "lean" operating mode to a second "rich" operating mode and vice versa. In the rich operating mode, the NOx adsorption catalyst is purged of nitrogen oxides stored therein as completely as possible. Other known methods, in particular in the control of diesel engines, use the fuel quantity to be injected as the central variable in the control of the engine torque. In doing so, the setpoint torque, determined on the basis of a driver-desired torque and coordinated with other demands, such as a transmission control, is converted into the fuel quantity to be injected by means of a special conversion module. The fuel quantity is determined by a characteristic curve, which is a function of the setpoint torque, using the instantaneous speed as characteristic-curve parameter (characteristic set).

In German Patent Application No. DE 100 30 936, a method is described in which a setpoint air mass and a setpoint fuel mass are determined from the input variables, fuel mass in lean operation, air mass in lean operation, lambda advantageous for regeneration and actual air mass. For this purpose, lambda values are converted into efficiency values, and vice versa, in three different processing blocks.

However, this method is not suitable for converting the setpoint torque into the fuel quantity to be injected when the internal combustion engine has a high excess of air (lean operation) since the torque and the fuel quantity are not linked in a simple manner in this operating mode.

It is an objective of the present invention to further refine a method of the type mentioned above, in such a way that it may be used in as uncomplicated a manner as possible and the two actuating variables, fuel quantity and air mass, are ascertained in a physically correct manner even when the air-fuel ratio is selectively modified.

SUMMARY OF THE INVENTION

In a method of the type mentioned above, this objective is achieved by ascertaining, from a target torque and an air mass determined with the aid of a model or a measured value, a variable that expresses a target air-fuel ratio, using a data model. In addition, a setpoint fuel quantity to be injected into the combustion chamber is determined. Furthermore, using the same data model, a setpoint air mass to be conveyed to the combustion chamber is ascertained from the target torque and a variable expressing a predefined air-fuel ratio in the combustion chamber.

A core idea of the present invention is that the correlation between air mass, fuel mass and torque of the internal combustion engine is established via a central data model and is used to determine the two central setpoint variables. Therefore, if at all, only two conversion blocks are required in the method according to the present invention, which, furthermore, use the same data model. The method according to the present invention may thus be implemented in a very simple and rapid manner. Moreover, the method according to the present invention is physically precise even for different air-fuel ratios since the determination of the setpoint fuel quantity to be injected is back-coupled to the calculation path of the setpoint air mass via the use of the determined air mass. Ascertaining the setpoint fuel quantity via a variable that expresses a target air-fuel ratio also results in a very stable method without a fluctuation tendency.

It should be mentioned in this context that the target torque, the air mass, etc. may also be expressed by corresponding variables, such as an accelerator-pedal position, a voltage of an HFM sensor or the like.

In a first further development it is provided that the variable expressing the air-fuel ratio is the inverse of the air ratio lambda. This simplifies the data model and the related calculations.

The method according to the present invention is especially advantageous if in the determination of the setpoint fuel quantity the variable expressing the target air-fuel ratio is restricted by an emission-specific limit value. This limit value, also referred to as "smoke limit", prevents an impermissible soot formation during operation of the internal combustion engine. Since it is not the fuel quantity to be injected that is limited, but rather the variable expressing the target air-fuel ratio, it is prevented that the setpoint fuel quantity is restricted sharply, which may lead to oscillations of the system and high-frequency excitations of the drive train. One of the reasons for this is the high dynamic response of the smoke limit.

On the other hand, until now there is the risk of oscillations, due to model imprecision in the modeling of the air mass (charge), since this depends on the engine speed, or on the torque, especially in the case of turbo engines. This, too, is avoided according to the present invention, since a calculation loop is avoided by a charge model.

It is advantageous in this context if the emission-specific limit value is determined from the air mass, ascertained with the aid of a model or a measured value, from the rotational speed of a crankshaft of the internal combustion engine and possibly from the position of the fuel injection onset relative to the angle of the crankshaft. In this case, the smoke limit does have a very high dynamic response, so that soot formation is reliably prevented; due to the afore-described robustness of the method according to the present invention, this is possible with respect to a highly dynamic smoke limit as well.

In a further refinement in this context, a filtering of a torque requested by a user of the internal combustion engine is provided as well. In this way, other dynamic interventions in the target torque, by a stability program, for example, or by a transmission joined to the internal combustion engine, remain unfiltered, which is important for their correct efficacy. According to the present invention, this is possible without complex queries, solely by placing the filter in a location of the method sequence before the mentioned interventions take effect. The filtering softens abrupt changes in the torque requested by the user of the internal combustion engine, thereby avoiding oscillation excitations of the drive system.

When determining the setpoint fuel quantity, it is also possible to restrict the variable expressing the target air-fuel ratio by at least one limit value, which is a function of the operating mode. This restriction may be set for an upper or a lower limit.

It is particularly advantageous if, near the limiting of the variable that expresses the target air-fuel ratio, the data model is populated in such a way that a soft transition to the limiting is produced. This further reduces the danger of oscillation excitations of the drive system and increases the comfort during operation of the internal combustion engine.

When the data model encompasses a characteristic set or a map, the method according to the present invention may be realized in an especially simple manner.

DETAILED DESCRIPTION

Figure 1:
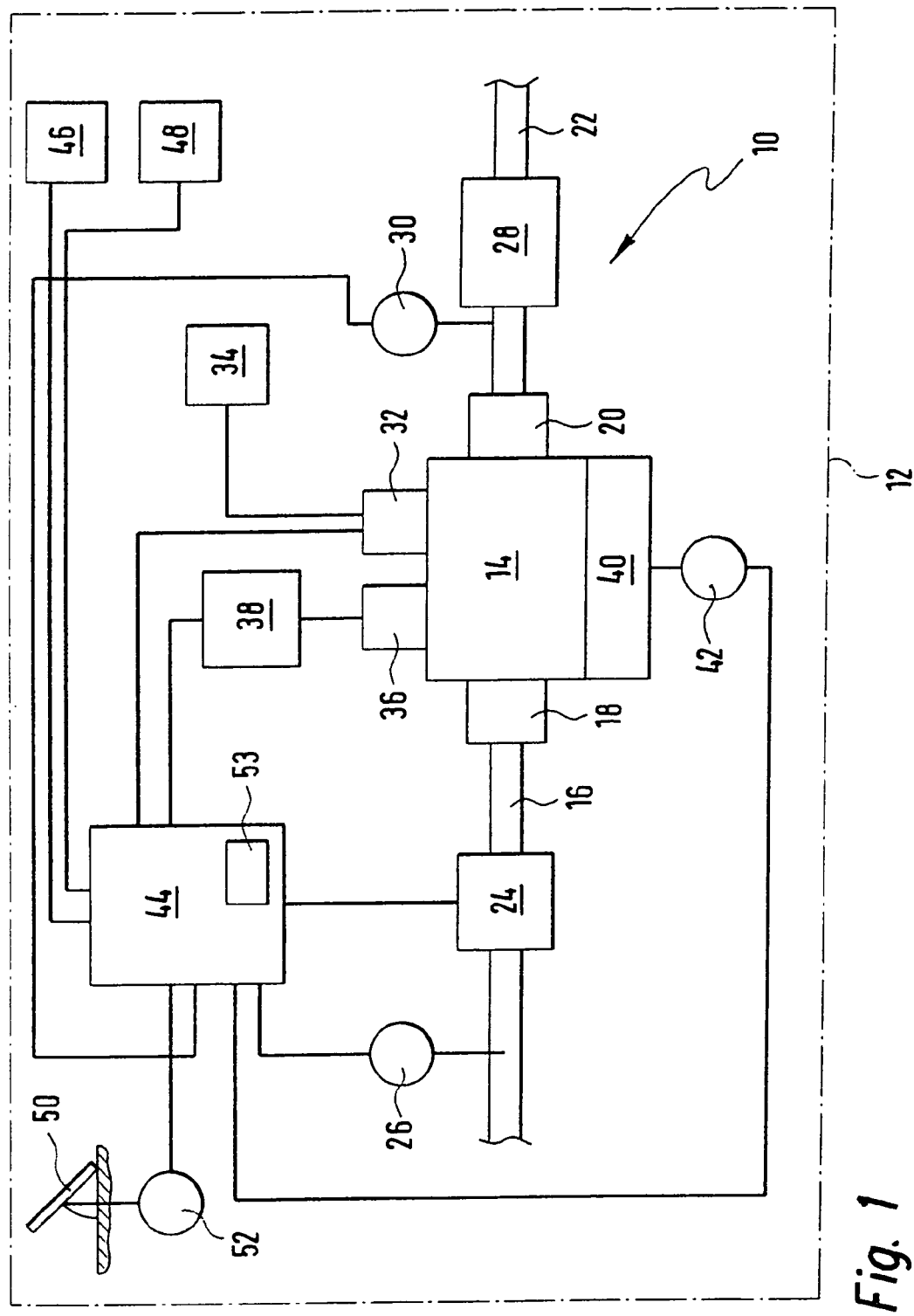
FIG. 1 shows a schematic basic representation of an internal combustion engine in a motor vehicle.
Figure 2:
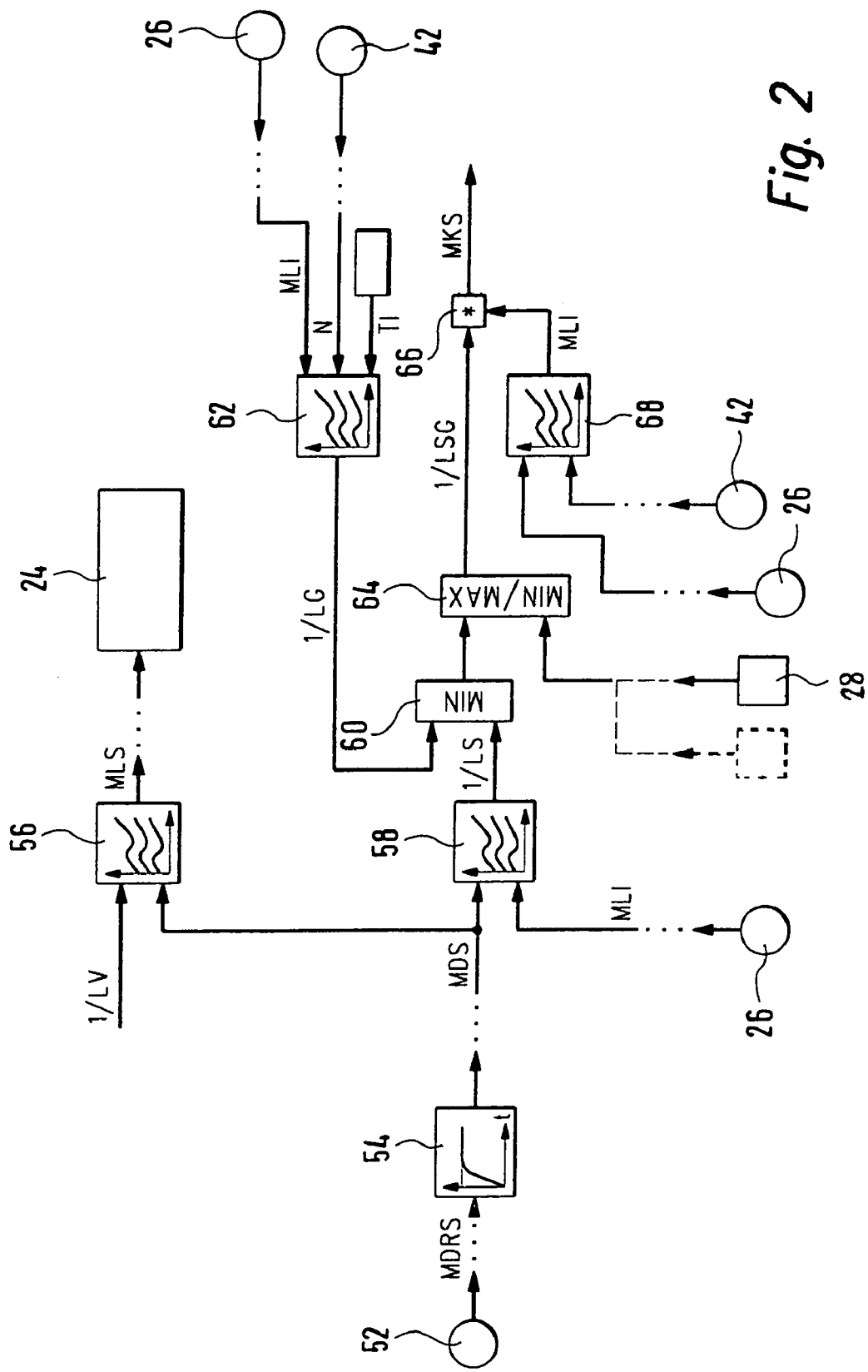
FIG. 2 shows a flow chart for operating the internal combustion engine from FIG. 1.

In FIG. 1, an internal combustion engine is designated as a whole by reference numeral 10. It is installed in a motor vehicle 12, which is only schematically indicated by a dot-dash line.

Internal combustion engine 10 includes a plurality of cylinders of which only one is shown in FIG. 1 for reasons of representation. It includes a combustion chamber 14 to which combustion air is conducted via a flow pipe 16 and an intake valve 18. The hot combustion gases are discharged via a discharge valve 20 and an exhaust pipe 22. The air quantity entering combustion chamber 14 may be adjusted via a throttle valve 24; it is measured by an HFM sensor 26. The combustion waste gases are purified in catalytic converter 28, which has a lambda probe 30.

Fuel enters combustion chamber 14 via an injector 32, which is supplied by a fuel system 34. The fuel-air mixture present in combustion chamber 14 is ignited by a spark plug 36 which is connected to an ignition system 38. However, it should be mentioned here that the method described in the following may be used in the same manner in diesel combustion engines as well, which will then not have a spark plug. The rotational speed of a crankshaft 40 is detected by a sensor 42.

The operation of internal combustion engine 10 is controlled or regulated by a control and regulating device 44, respectively. Connected to control and regulating device 44 are throttle valve 24, ignition system 38 and injector 32, among others. Information is provided to control and regulating device 44 by HFM sensor 26, speed sensor 42, catalytic converter 28 as well as a transmission 46 and a stability system 48. The position of an accelerator pedal 50 is read off by a pedal valuator device 52, which likewise transmits signals to control and regulation device 44.

Internal combustion engine 10 shown in FIG. 1 is operated in different operating states, each of which differs in the fuel-air ratio of the fuel-air mixture present in combustion chamber 14. In order to be able to set the target torque in the case of a certain mixture composition that corresponds to the particular operating mode, it is proceeded according to a method that will now be discussed in detail with reference to FIGS. 2 through 7. The method is stored as computer program in a memory 53 of control and regulating device 44.

Figure 3:
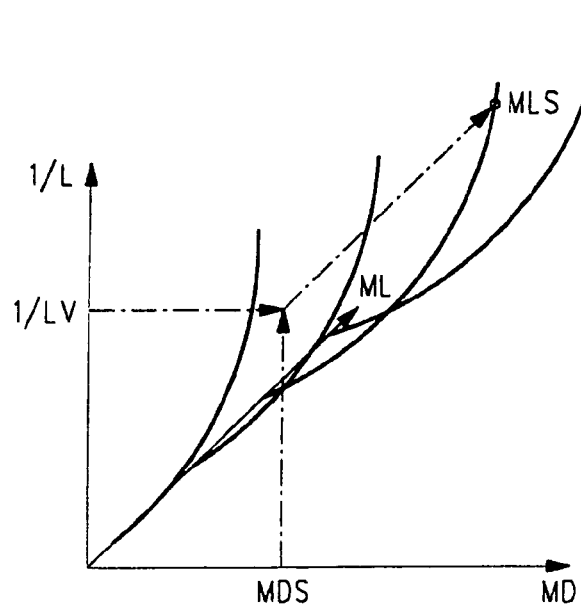
FIG. 3 shows a diagram of a data model, which links the inverse of the lambda air ratio, a torque and an air mass, for elucidating a first method step of the method of FIG. 2.
Figure 4:
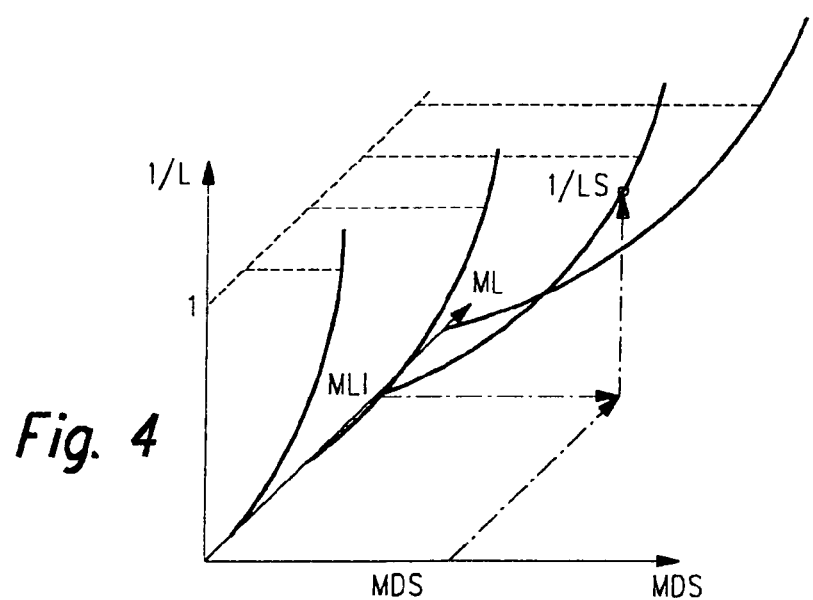
FIG. 4 shows a diagram similar to FIG. 3 to elucidate a second method step of the method of FIG. 2.
Figure 5:
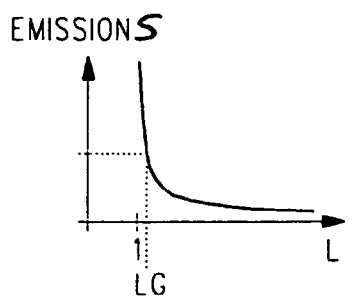
FIG. 5 shows a diagram to elucidate an emission-specific limit value for the lambda air ratio.

Depending on the operating mode, a certain air ratio LV is preselected by control and regulating device 44. A signal MDRS from pedal valuator device 52 is fed to a filter 54 and results in a torque MDS desired by the driver of motor vehicle 12. This and the inverse 1/LV of air ratio LV are supplied to a characteristic set (block 56). The corresponding diagram is illustrated in FIG. 3. The characteristic set in block 56 links inverse 1/L of air ratio L, torque MD and the corresponding air mass ML. Characteristic set 56 outputs a setpoint air mass MLS, which ultimately leads to a corresponding triggering of throttle valve 24.

The actual air mass MLI entering combustion chamber 14 via flow pipe 16 is detected by HFM sensor 26 and fed into a characteristic set 58 (cf. FIG. 4), together with target torque MDS. Characteristic set 58 is basically identical to characteristic set 56, that is, it corresponds to the same data model. Characteristic set 58 outputs inverse 1/LS of a setpoint air ratio LS, which is fed to a minimum-value block 60.

Also fed to minimum-value block 60 is an inverse 1/LG of a limit-air ratio LG, which is determined with the aid of a map 62 to which a fresh-air mass flow MLI determined by means of HFM sensor 26, a rotational speed N of crankshaft 40 ascertained by speed sensor 42, and, if appropriate, the instantaneous position TI of the onset of a fuel injection relative to the angle of crankshaft 40 are in turn supplied. Physically, the limit-air ratio LG defines a so-called "smoke limit", that is, a composition of the fuel-air mixture that is only just permissible with respect to emissions (cf. FIG. 5). Block 60 outputs the smaller of the two values 1/LG and 1/LS.

Figure 6:
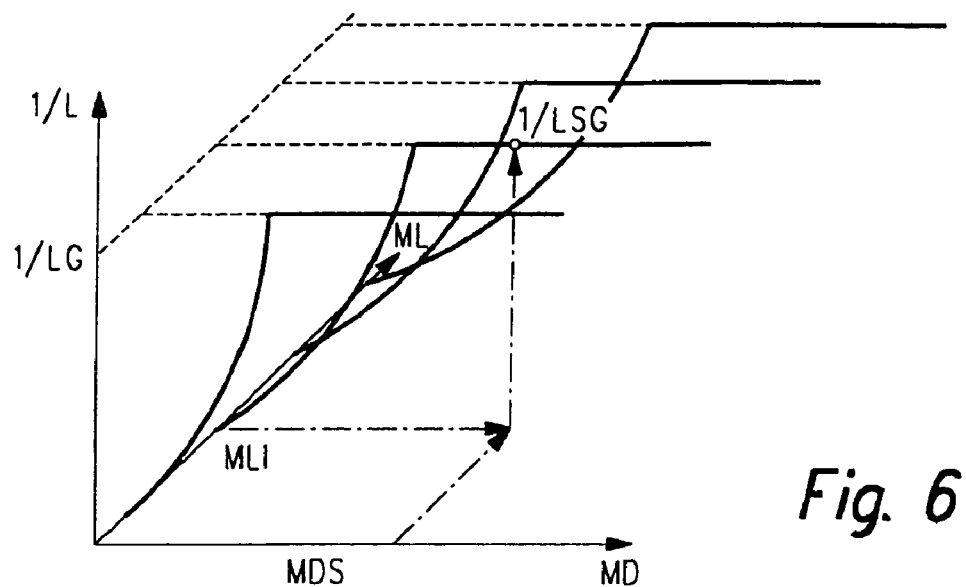
FIG. 6 shows a diagram similar to FIG. 3 to elucidate a third method step of the method of FIG. 2.

FIG. 6 provides an especially clear illustration of the limiting of inverse 1/LSG by inverse 1/LG of limit-air ratio LG. One can see that, in the case of the given actual air mass MLI, a (temporally) rising target torque MD is converted into an increasing setpoint value for inverse 1/L, until limit value 1/LG is reached. A further increase in target torque MD does then not cause an increase in inverse 1/L.

The value resulting from block 60 is supplied to a block 64 in which the upper and lower limits are defined once more. In this way, additional marginal conditions or operating modes of internal combustion engine 10 are taken into account, which are predefined by the operating conditions of catalytic converter 28, for instance (or in general by the exhaust system). Other operating modes and operating-mode transitions may be taken into account here as well. The result is an inverse 1/LSG of a limited setpoint air ratio LSG, which is multiplied in 66 by the actual air mass MLI, which is determined by means of a map 68 on the basis of the measured values of sensors 26 and 42. The result is a setpoint fuel quantity MKF to be injected into combustion chamber 14.

Figure 7:
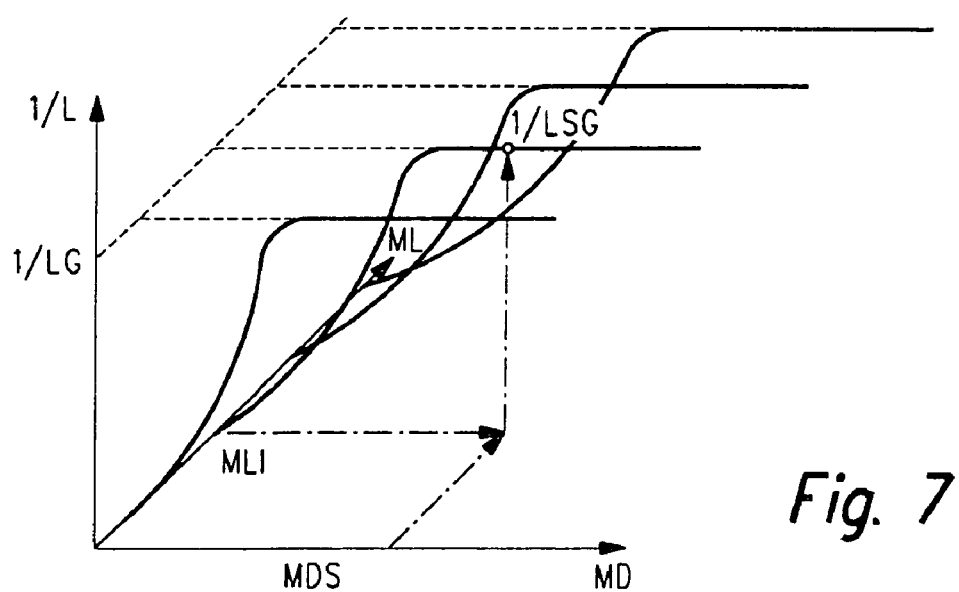
FIG. 7 shows an alternative to the diagram of FIG. 6.

FIG. 7 shows an alternative to the procedure in FIG. 6. This alternative has the purpose of avoiding the excitation of judder vibrations in the drive train of motor vehicle 12. In a differentiable profile of the characteristic curves of the characteristic set, a differentiable (filtered) profile of target torque MD is shown on a differentiable characteristic of inverse 1/L. In this way, excitations due to a "hard" cut-off of inverse 1/L, and subsequently fuel mass MKS to be injected, are avoided.

As an alternative, in the case of a non-differentiable profile of the characteristic curve, a gradient limit may be provided for those values of inverse 1/L that are within the range of inverse 1/LG. This is possible because the state is able to be determined very easily in the described method, even in the vicinity of the "smoke limit".

It can be seen that inverse 1/L of air ratio L is the central variable for determining the setpoint values for fuel mass MKS to be injected, and for air mass MLS to be supplied, and that a single data model is used in the central calculations or determinations.

What is claimed is:

1. A method for operating an internal combustion engine in which an air-fuel ratio in a combustion chamber is a function of at least one of (a) operating conditions and (b) an operating state of the engine, the method comprising:
   using a data model, determining a variable expressing a target air-fuel ratio from a target torque and an air mass ascertained with the aid of one of a model and a measured value, and determining a setpoint fuel quantity to be injected into the combustion chamber; and
   using the data model, determining a setpoint air mass to be conducted to the combustion chamber from the target torque and the variable expressing the air-fuel ratio in the combustion chamber.

2. The method according to claim 1, wherein, when determining the setpoint fuel quantity, the variable expressing the air-fuel ratio is limited by at least one limit value, which is a function of an operating mode.

3. The method according to claim 1, wherein the data model includes at least one of a characteristic set and a map.

4. A method for operating an internal combustion engine in which an air-fuel ratio in a combustion chamber is a function of at least one of (a) operating conditions and (b) an operating state of the engine, the method comprising:
   using a data model, determining a variable expressing a target air-fuel ratio from a target torque and an air mass ascertained with the aid of one of a model and a measured value, and determining a setpoint fuel quantity to be injected into the combustion chamber; and
   using the data model, determining a setpoint air mass to be conducted to the combustion chamber from the target torque and the variable expressing the air-fuel ratio in the combustion chamber;
   wherein the variable expressing the air-fuel ratio is an inverse of an air ratio lambda.

5. A method for operating an internal combustion engine in which an air-fuel ratio in a combustion chamber is a function of at least one of (a) operating conditions and (b) an operating state of the engine, the method comprising:
   using a data model, determining a variable expressing a target air-fuel ratio from a target torque and an air mass ascertained with the aid of one of a model and a measured value, and determining a setpoint fuel quantity to be injected into the combustion chamber; and
   using the data model, determining a setpoint air mass to be conducted to the combustion chamber from the target torque and the variable expressing the air-fuel ratio in the combustion chamber;
   wherein, when determining the setpoint fuel quantity, the variable expressing the air-fuel ratio is limited by an emission-specific limit value.

6. The method according to claim 5, wherein the emission-specific limit value is determined from the air mass, ascertained with the aid of one of a model and a measured value, and from a rotational speed of a crankshaft of the engine.

7. The method according to claim 6, wherein the emission-specific limit value is determined further from a position of an onset of a fuel injection relative to an angle of the crankshaft.

8. The method according to claim 5, further comprising filtering a torque desired by a user of the engine.

9. The method according to claim 5, further comprising populating the data model, in a vicinity of a limiting of the variable expressing the air-fuel ratio, in such a way that a soft transition to the limiting is produced.

10. A computer-readable medium storing instructions adapted to be executed by a processor, the instructions, when executed, defining a method to operate an internal combustion engine in which an air-fuel ratio in a combustion chamber is a function of at least one of (a) operating conditions and (b) an operating state of the engine, the method comprising:
   using a data model, determining a variable expressing a target air-fuel ratio from a target torque and an air mass ascertained with the aid of one of a model and a measured value, and determining a setpoint fuel quantity to be injected into the combustion chamber; and
   using the data model, determining a setpoint air mass to be conducted to the combustion chamber from the target torque and the variable expressing the air-fuel ratio in the combustion chamber.

11. A control/regulating device for an internal combustion engine, comprising:
   a means for determining, using a data model, a variable expressing a target air-fuel ratio from a target torque and an air mass ascertained with the aid of one of a model and a measured value, and determining a setpoint fuel quantity to be injected into the combustion chamber; and
   a means for determining, using a data model, a setpoint air mass to be conducted to the combustion chamber from the target torque and the variable expressing the air-fuel ratio in the combustion chamber.

* * * * *